United States Patent [19]
Peterson, II

[11] Patent Number: 5,448,604
[45] Date of Patent: Sep. 5, 1995

[54] CASK TRANSPORT, STORAGE, MONITORING, AND RETRIEVAL SYSTEM

[76] Inventor: William D. Peterson, II, 2219 Panorama Way, Holladay, Utah 84124

[21] Appl. No.: 251,134

[22] Filed: May 31, 1994

[51] Int. Cl.⁶ .............................................. G21C 19/00
[52] U.S. Cl. .................... 376/261; 376/272; 414/146; 414/347; 414/391; 414/399; 104/48
[58] Field of Search ............... 376/272, 260, 261, 287, 376/245; 414/146, 340, 347, 390, 391, 392, 399; 104/48

[56] References Cited
U.S. PATENT DOCUMENTS

| | | | |
|---|---|---|---|
| 3,940,577 | 2/1976 | Christofer | 376/272 |
| 4,065,006 | 12/1977 | Barry | 414/340 |
| 4,481,165 | 11/1984 | Anderson et al. | 376/272 |
| 4,800,062 | 1/1989 | Craig et al. | 376/272 |

Primary Examiner—Daniel D. Wasil

[57] ABSTRACT

A transport, storage, monitoring, and retrieval system for casks including intermediate storage of spent fuel rods from nuclear power plants. The system consists of a powered rail transport car which carries a cask standing on its end. A cross-ways traveling powered rail "under car" unit carries the rail transport car and loaded cask transversely on rails underneath to align with a bay rail which the powered rail car traverses to the cask storage location. Bridge cranes off-load the casks and with monitoring equipment perform remote cask inspections. Bay rails and a pair of cross-ways traveling "under car" units serve for movement of both the transport car and the bridge units. Casks are located automatically at specific addresses for inventory control and data logging of radioactive emissions. The system may operate remotely and cask conditions are monitored from automated retrieved collected at an off-site data base.

7 Claims, 2 Drawing Sheets

CASK TRANSPORT, STORAGE, MONITORING, AND RETRIEVAL SYSTEM

BACKGROUND OF THE INVENTION 108 nuclear power plants operate in the U.S. without any servicing off-site facility for storage of their spent nuclear fuel rods. When fuel rods are taken out of commission they are immediately put into under water storage at the power plant site where the water absorbs the inherently generated heat. In time the fuel rods decay and the heat generation diminishes. After five years the uranium material is sufficiently decayed that the rods can be stored unconfined in an open air arena. A permanent spent fuel storage facility is planed in the Yaka Mountain region of Nevada. Until then, a "Modular Retrievable Storage" (MRS) facility is being sought for the intermediate storage of the spent fuel. The author of this patent has worked on many varieties of nuclear material transport equipment and facilities for nuclear fuel since 1958.

STATEMENT OF THE ART

Eight schemes for intermediate storage of the spent fuel have been made for the "MRS" concept. This has culminated into one concept of storage where the spent fuel rods are encapsulated in concrete and stand vertically on pads in an open field. Proposed placement is by truck transport to the storage field where a mobile crane off-loads the casks. Once in place, a human inspector person routinely inspects, measures, and records each cask for radiation emission leakage.

The invention is a more sophisticated system of remotely operated cask placing, monitoring, and automated retrieval of cask surface conditions data. Cask condition data is transmitted to an off site data base where the acquired data is analyzed automatically by computer. Cask monitoring data would routinely transmitted to the off-site data base. Trending analysies will be used to predict the safe storage life of the individual casks. When excessive leakage limit conditions are determined notices for correction would automatically be made to appropriate persons.

Even though human work at the storage site is safe, nuclear radiation technology is somewhat misunderstood and some people still consider the operation risky. The inventor's integrated system eliminates on-site human exposure and assures totally controlled, safe lifting, transport and testing of the casks. The inventor's system of automated computer controlled cask testing has significant advantage over manual testing in that the field of automated testing is accurate, consistent, and will exactly and totally trace over the exterior surfaces of each cask on a regular schedule. All test data would be transmitted to an off-site data base for a permanent record of storage conditions of the casks. Should an unacceptable leakage condition occur, an automatic alarm would signal a required correction and the problem cask would be retrieved and have its encapsulation corrected.

Very importantly, this well defined specific, state of art and unique handling system is proposed to teach and convince the public, political leaders and interested persons of a safe procedure for solving the spent fuel rod storage problem.

BRIEF SUMMARY OF THE INVENTION

Spent nuclear fuel rods are encapsulated within concrete cylinders. The casks weigh 132 tons and are 8 feet in diameter and stand 16 feet tall on end. The invention is an integrated transport, placement, and monitored storage and retrievable facility for the heavy casks of contaminating material. The casks are stored in designed matrix. The matrix has specific individual location addresses for the placement of each casks according to an X-Y cartesian measured location. The exact address location for each cask is recorded at the data base when the cask is placed. Each cask is systematically and routinely monitored for its condition in storage and the testing results automatically transmitted to and recorded in an off site data base. The data is automatically reviewed and analyzed for a problem condition. When a problem situation is determined, appropriate personnel are automatically notified.

BRIEF DESCRIPTION OF THE DRAWINGS

The FIGS. of 2(a-d) and (3a-d) show the pony locomotive, transport car, "under car" bridge crane, and cask in orthographic elevation. FIGS. 2(a-d) are looking in the "X" coordinate direction. FIGS. 3(a-d) are looking in the "Y" coordinate direction.

FIG. 2 is a section view at a field RR track showing in FIG. 2(a) a RR-car coupled to a pony locomotive on a RR-rail to the site.

FIG. 3 is a section view at the "under-car" RR track showing in FIG. 3(a) an end view of a transport car parked on a field RR rail.

DETAILED DESCRIPTION OF THE INVENTION

Figure 1:
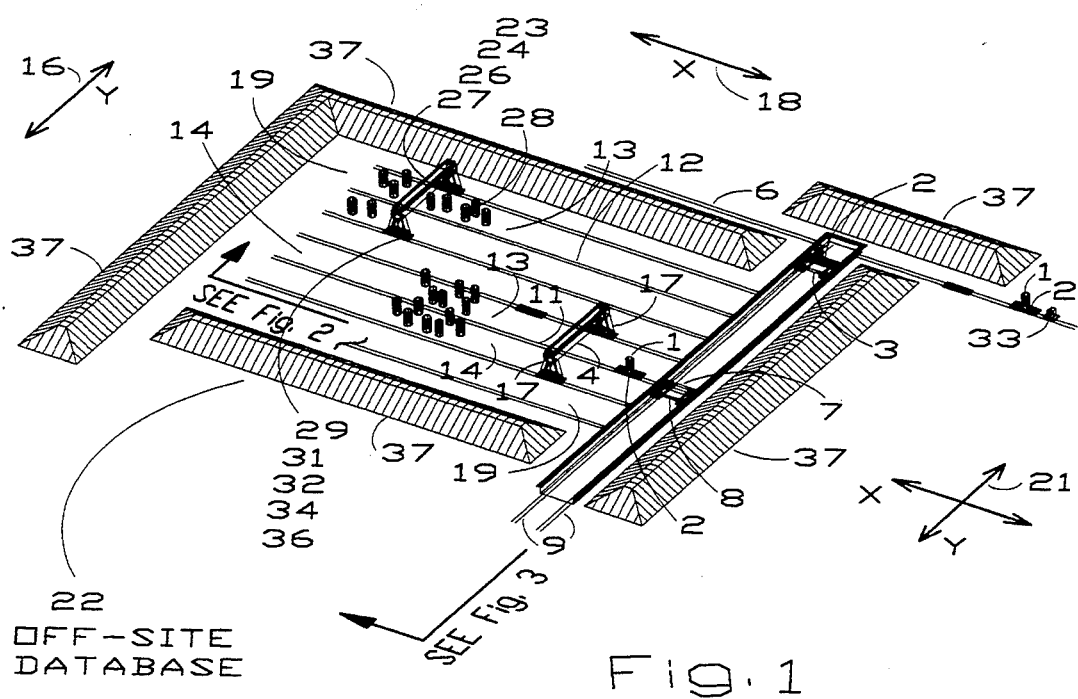
FIG. 1 is an isometric view of the site operation shows entering trackage, an earthen berm around a site storage field, parallel trackage in the field, with a transverse traveling RR-rail mounted RR-rail "under car" operating on an underneath cross-wise rail for shuttling field servicing bridge cranes and cask carrying transport cars into and out of the field. The transverse RR-rail mounted rail "under car" moves the equipment perpendicular to the field rail bays.
Figures 2A, 2B, 2C, 2D:
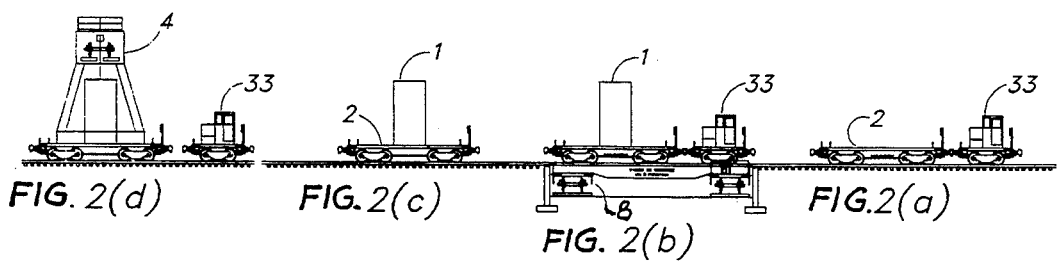
FIG. 2(b) shows a RR car loaded with a cask coupled to a pony locomotive, both being carried on a cross wise traveling "undercar"
FIG. 2(c) shows a RR car loaded with a cask on a field track.
FIG. 2(d) shows a bridge crane nearly coupled with a pony locomotive used to move the bridge along a field RR track.
Figures 3A, 3B, 3C, 3D:
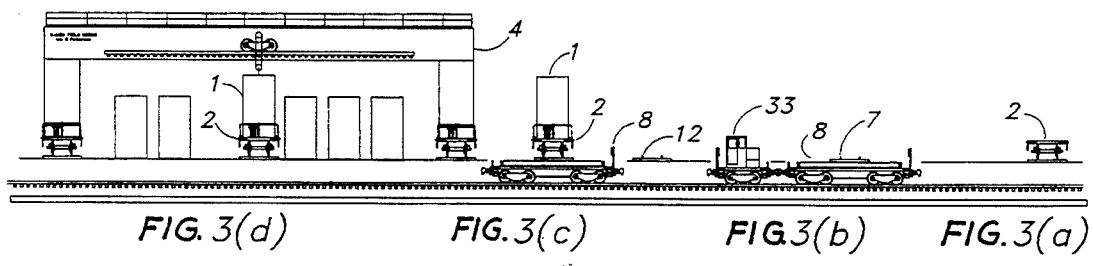
FIG. 3(b) shows a pony locomotive coupled to an "under-car" which consist of two, a pair of flat bed RR cars carrying a platform between them as seen in FIG. 2(b) above.
In FIG. 3(c) a second "under car" is shown carrying a cask ladened flat bed RR car, In FIG. 3, above and beyond the "under car" RR track is shown in FIG. 3(a) the end view of a flat bed RR car and FIG. 3(d) a bridge crane straddling off loaded and standing casks adjacent to a RR car loaded with a cask. All of these could be at a random location on the storage field rail system.

A cask for storage 1 is brought to the site on a rail transport car 2. A cross-ways traveling—transverse transporter "under car" 3 underneath the transport car 2 with the cask 1 carries them transversely to a position where the car 2 with cask 1 may again proceed straightly to a position for off-loading the cask 1 which is lifted off with a hoist equipped bridge crane 4.

A rail 6 to the site communicates with a car bed rail 7 affixed to the bed 8 of a transverse transport "under car" 3. The cross-ways traveling "under car" 3 rides on a underneath transverse rail 9 which carries the transverse transport "under car" 3 to such a position where its bed 8 mounted rail 7 communicates with a bay rail 11 to an off-loading location. A off-loading bay rail 11 is straddle by the bridge crane 4/23 carrying rails 12. The cask 1 is set on a prepared level pad 13 within the express bay 14. Any one of the bay rails 12 can serve as a bridge 4/23 end truck carrying rail 12. Any bay rail 12 being straddled by a bridge crane 4/23 can function as a off-loading rail 11 for carrying a bridge crane 4/23.

An active bay 14 extends in the Y coordinate 16 from one bridge crane 4 upright 17 to its other bridge crane 4/23 upright 17. A car carrying rail 11 extends the X coordinate 18 length of the active bay 14. A multitude of such bays 14 makes up a field 19 for term storage of a quantity of casks 1. In the field 19 "X" 18 coordinates and "Y" 16 coordinates establish a matrix 21 which defines the precise location of each cask 1 on its pad 13. With this information in a data base 22 a remote operating inspection bridge crane 23, equipped with tracking gear 24 and remote control 26 guides the remote bridge crane 23 to each of the casks 1. The remote bridge crane 23 is equipped with cask surface inspecting equipment 27 for testing the total exterior surface 28 of each cask 1 for sub-standard conditions.

The flat bed rail transport cars 2, the rail bed transverse rail "under cars" 3, the hoist equipped bridge crane 4, and the inspection bridge crane 23 wheels 29 are motor 31 driven with carriage motor remote control 32 capabilities. The equipment could be moved by a pony locomotive 33 and could be operated with over-riding on-board manual controls 34 as well as with remote control 32 capabilities. This would require that the carrying rails 7 on the bed of the "under car" 3 be sufficiently long to accommodate both a transport car 2 and a pony locomotive 33.

The off-loading hoisting bridge crane 4 changes bays 14 as necessary by traversing the bay rails 11 to onto two cross-ways traveling transverse rail "under car" 3 which carries the bridge crane 4 to a straddle position in line with the next working bay 14. The bridge crane 4 then off-loads from the cross-ways traveling "under car" 3 carrying rail cars along straddling bay rails 11 to a position straddling the bay rail 11 at the coordinate 16/18 for off-loading other casks 1 at their designated bay 14 pad 13 locations. To compensate for distance variances between parallel sets of bay rails 11/12, one of the two bridge crane 4/23 uprights 17 would be equipped with a bridge 4/23 span width adjustment capability 36.

Casks 1 are retrieved from the field 19 in the reverse order of how they are placed. The field 19 is shielded by an earthen berm 37.

What is claimed is:

1. A site transport, storage monitoring, and retrieval system for casks of spent nuclear fuel, comprising
   a field of rows of rail road trackage, surfaces between the rows for standing off-loaded casks for storage;
   transverse rail trackage and transverse traveling rail under-cars, said transverse rail trackage carrying said rail under-cars, said rail under-cars having an integral rail trackage affixed to the surface of their beds, said integral rail trackage can be aligned as an extension of any rail row and function to carry other cars from one row to another or to or from the field;
   one or more bridge cranes traversing field rails while spanning over one or more rows of rail;
   one or more cask carrying transport cars for traveling the field rails, said transport cars can be off-loaded or loaded while under a bridge crane; and
   said transport cars and bridge cranes communicating with the integral rails of positioned rail under-cars to move from sets of field rails to other sets of field rails or to commute with off-site locations to bring in or take out casks or equipment.

2. Claim 1 and further having a bridge crane equipped with monitoring equipment to rove around the standing casks and check for contamination leakage.

3. The system of claim 2 and further having motors and control mechanisms such that the system can be operated remotely.

4. The system of claim 3 and further having an interfacing data base having equipment for receiving and maintaining location and status records for the casks and for receiving new inspection data, equipment to analyze the data, and equipment to use the analysis and determine defective conditions, and the system has equipment to generate alarms and initiate notifications that a problem or potential problem exists in the field when defective conditions are determined.

5. The system of claim 1 and further having locomotion power with pony locomotives, using one locomotive for powering a transport car and using a locomotive on each end to move a bridge crane or an under-car, the width of said under-cars being sufficient to accommodate both a transport car being moved and a pony locomotive.

6. The system of claim 2 and further having a bridge crane equipped with a bridge span width adjuster for adjusting the distance between the crane ends.

7. The system of claim 2 and further having an earthen berm for shielding.

* * * * *